United States Patent Office 2,867,284
Patented Jan. 6, 1959

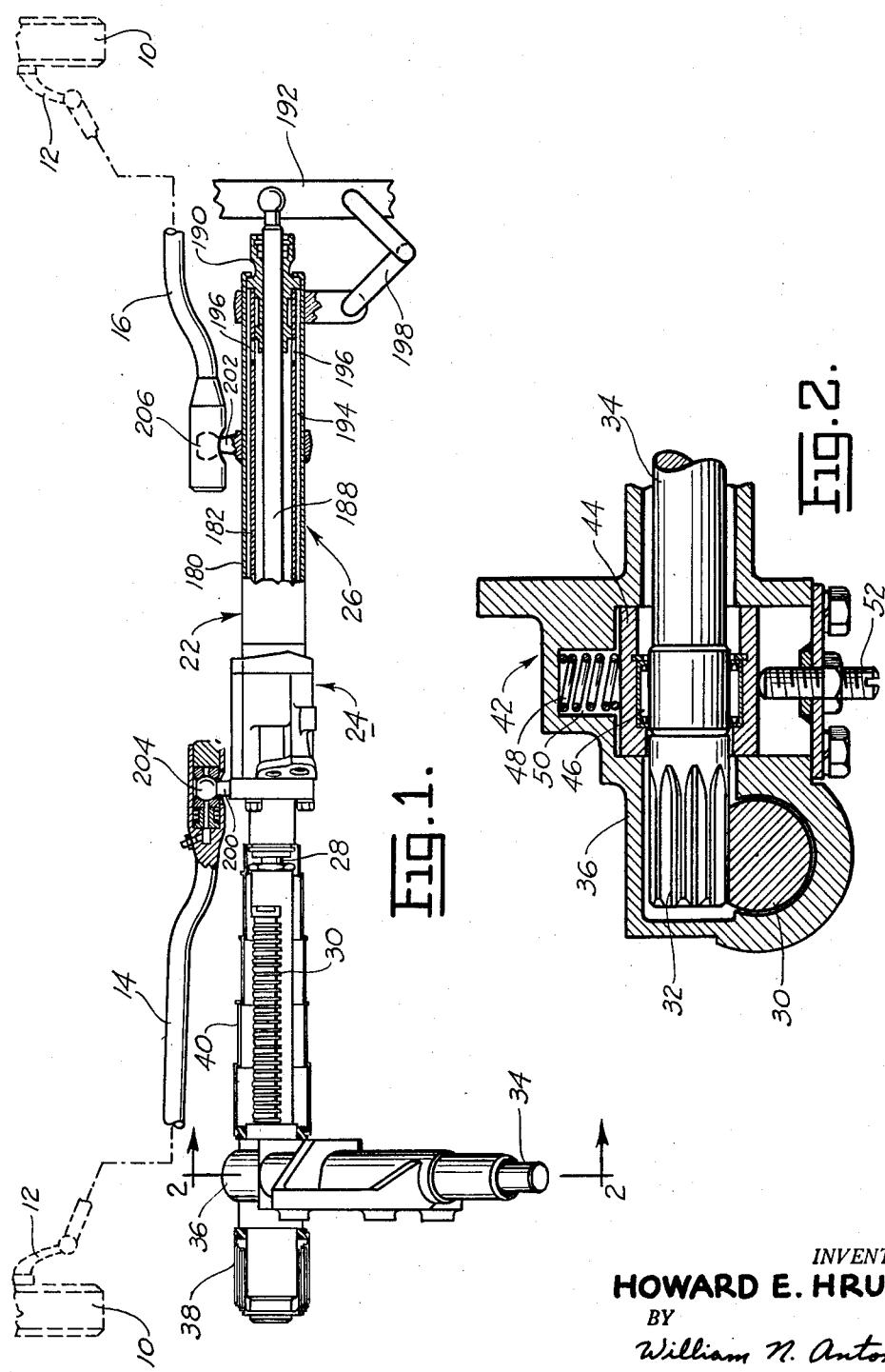

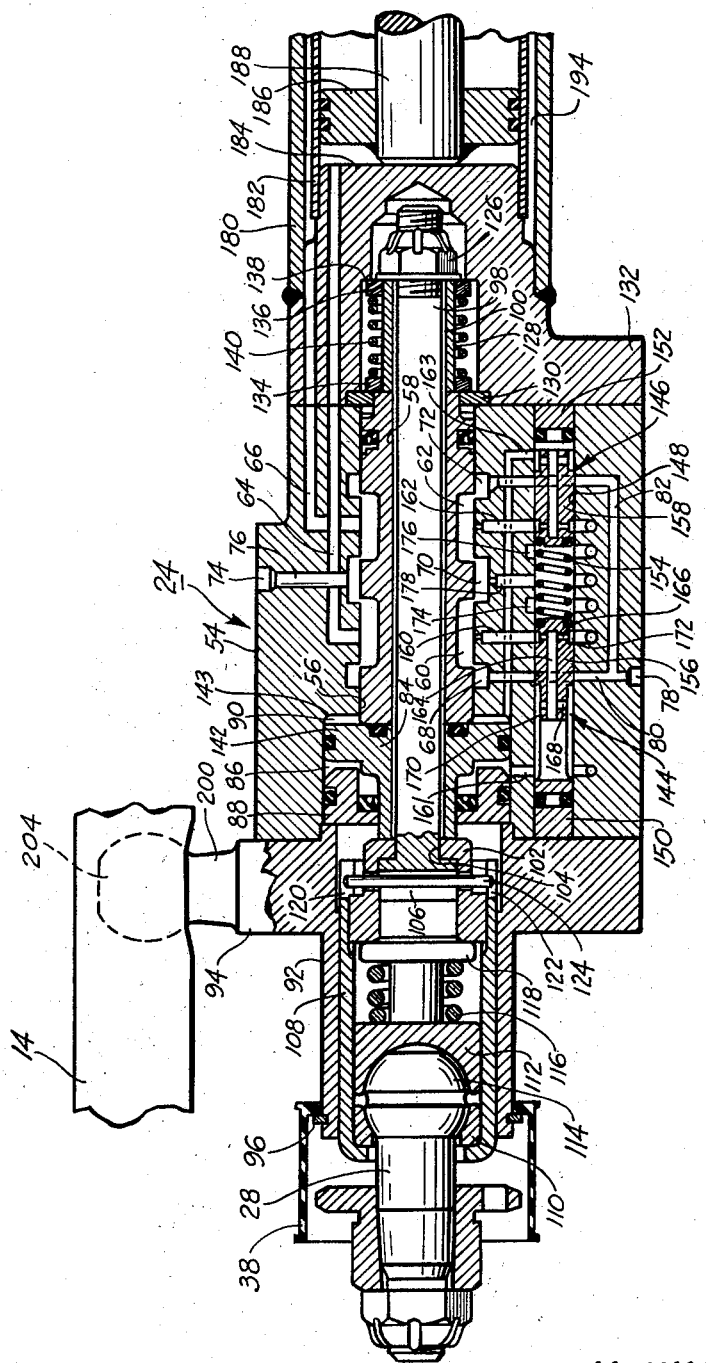

2,867,284

HYDRAULIC POWER STEERING DEVICE WITH RACK AND PINION ACTUATING MEANS

Howard E. Hruska, South Bend, Ind., assignor to Bendix Aviation Corporation, South Bend, Ind., a corporation of Delaware Application June 13, 1955, Serial No. 514,865

3 Claims. (Cl. 180—79.2)

This invention relates to power steering, and more specifically to an improved hydraulic power steering unit for a ground vehicle.

An object of this invention is to provide a power steering device which does not use the conventional steering gear and linkage, thereby reducing the cost of the complete steering mechanism.

Another object of this invention is to provide a power steering device having a combination valve and power unit with a steering gear which will improve the steering geometry of the device.

A further object of this invention is to improve the irregular steering geometry in combined power steering units resulting from the arcuate movement of the conventional pitman arm, by eliminating the pitman arm along with the standard steering gear.

A still further object of this invention is to provide a power steering unit which will replace the conventional steering gear, pitman arm, cross steering rod, idler lever, control valve, power cylinder and outside conduits for connecting the valve with the cylinder.

Another object of this invention is to provide a combined unit linkage type power steering device which is actuated directly by a rack and pinion.

An important object of this invention is to provide a rack construction which permits valve actuation directly from a pinion gear cut on the steering column shaft thereby permitting a direct transfer of steering wheel rotation into a transverse movement of the valve actuator resulting in an improved steering geometry for the device.

A further object of this invention is to provide a combination control valve, power unit, and steering gear to effect power steering in a more efficient, inexpensive, and satisfactory manner than has heretofore been known.

The above and other objects and features of the invention will become apparent from the following description of the apparatus taken in connection with the accompanying drawings which form a part of this specification, and in which:

Figure 1 is a schematic view of the steering mechanism with certain portions in partial section;

Figure 2 is a sectional view, taken on line 2—2 of Figure 1; and

Figure 3 is an enlarged sectional view of the control valve and adjoining structure.

Referring to Figures 1 and 2 of the drawings, numeral 10 designates steerable wheels of a vehicle. Spindle arms 12 are associated with the wheels 10 and are connected to spindle tie rods or side links 14 and 16. The tie rods 14 and 16 are connected to a hydraulic system comprising a pump and reservoir (not shown), and a combined unit 22, which includes a control valve 24 and a power cylinder 26 capable of turning the wheels 10 through the tie rods 14 and 16. The control valve 24 is actuated through ball stud 28 which is connected to a rack type valve actuator 30. The actuator is set in motion by a pinion gear 32 which is cut on the end of the steering column shaft 34 meshing with the rack 30. The steering shaft 34 and rack actuator 30 lie partially within a housing 36. The rack 30 is disposed in the housing so as to be in coaxial alignment with the control valve 24 and power cylinder 26 and also perpendicular to the steering shaft 34. Telescoping nylon boots 38 and 40 enclose the ends of rack 30. The proper mesh is maintained between the rack 30 and the pinion 32 by means of an adjusting mechanism 42 as shown in Figure 2. The adjusting mechanism includes an annular block 44 which surrounds the shaft 34 and a needle bearing 46 interposed between the block and shaft. A coil spring 48 lies within a cavity 50 in the housing 36 exerting pressure against said block 44. Diametrically opposite said spring is an adjusting screw 52 which abuts said block 44. A predetermined turn of the adjusting screw will provide the proper pinion gear clearance.

The control valve 24 as shown in Figure 3 includes a housing member 54 with a bore 56 therein. A valve member 58 lies within bore 56 and is movable in opposite directions from a normally neutral or center position, thereby controlling flow in the hydraulic system. The valve member 58 is formed with two annular channels 60 and 62 which communicate with cylinder passages 64 and 66 respectively. The bore 56 of the valve housing is provided with annular channels 68, 70, and 72. Annular channel 70 is in communication with a return port 74, by way of passage 76. Annular passages 68 and 72 communicate with an inlet port 78 through passages 80 and 82. The control valve shown is an open center type valve which in neutral position allows free flow of the hydraulic fluid between the inlet port 78 and the return port 74 via the annular channels which are arranged in overlapping relationship.

Annular reaction member 84 is located at one end of valve member 58 thereby forming reaction chamber 86 with the sealed bushing 88 and reaction chamber 90 with the valve housing 54. These reaction chambers are in effect hydraulic pressure reaction means built into the control valve in order to oppose movement of the valve member 58 away from its neutral position. In other words, the hydraulic pressure communicated to these chambers acts on the reaction member 84 which tends to oppose relative movement of the valve member 58 from neutral and to restore it to neutral when such movement occurs. The pressures in the reaction chambers oppose movement of the valve member with a force equal to the effective areas of the movable walls multiplied by the unit pressure in the chambers. This force which is in the form of a reaction force is transmitted to the operator of the vehicle through valve actuator 30.

The sealed bushing 88 is held in position by an outer sleeve 92 having a flange 94 abutting the valve housing 56. One end of the telescoping nylon boot 38 is connected to outer sleeve 92 by a retaining ring 96.

The valve member 58 is operatively connected to the ball stud 28 and valve actuator 30 for sliding movement in the bore. The connection to the stud is an assembly of parts comprising a bolt 98, extending through a central passage 100 of the valve member, a bushing 102 having an opening 104 therein which passes the small diameter of the bolt but not the enlarged end 106, an inner sleeve 108, to which bushing 102 is splined, members 110 and 112 providing sockets for a spherical end 114 of the stud, an anti-rattling spring 116 and a ball socket stop member 118 which abuts bushing 102. The inner end of the sleeve 108 is slotted at 120 and 122 to receive the ends of pin 124 thereby preventing rotation of the assembly in the bore. The pin 124 passes through the bushing 102 and enlarged end 106 of the bolt 98 in order to prevent the latter from turning when the nut 126 is applied thereto. Between the valve member 58 and the nut 126 is a spacer sleeve 128. A stop ring 130 is fixed between the valve housing 54 and plug 132 so that valve member 58 may move with respect thereto. Retaining ring 134 which abuts stop ring 130 and retaining ring 136 which abuts a shoulder 138 within the plug 132 confine a preloaded centering spring 140. With nut 126 tightened down against the spacer sleeve 128, movement of the valve actuator 30 will cause the valve member and assembly to move as a unit within the sleeve 108, valve housing 54, and plug 132.

Note that reaction member 84 has a radially extending flange 142 which engages the side of sealed bushing 88 when the valve member 58 is moved to the left and a shoulder 143 within the valve housing when the valve member is moved to the right. This positive engagement between the above mentioned members permits manual steering after a predetermined movement of the valve member in the event of power failure.

Regulating valve means 144 and 146 control the pressures in reaction chambers 86 and 90 respectively. If the resistance offered to steering becomes sufficiently great so as to cause the pressure required for power assistance to exceed a predetermined value, the regulating valves will come into action, shutting off communication to the reaction chambers. In this manner a proportionally increasing "feel" is provided up to a predetermined pressure and a constant "feel" thereafter. The regulating valves are arranged in a bore 148 of the housing member. Plugs 150 and 152 close the ends of the bore against leakage to atmosphere. A spring 154 arranged between the adjacent ends of the valve elements 156 and 158 urges the respective elements against the plugs 150 and 152. The spring is designed to be overcome when the pressure acting over the areas of the valve elements adjacent the plugs reaches the predetermined value. Passages 160 and 162 connect annular channels 60 and 62 with the bore 148. Passages 161 and 163 connect the chambers 86 and 90 respectively with the bore 148.

Since the valve elements 156 and 158 are identical, only one will be described. An axial passage 164 connects radial passage 166 with radial passages 168. The outer end 170 of each valve element is of reduced diameter so that the ends of the valve elements will not hinder communication with the passages 161 and 163. The radial passage 166 terminates at its outer end in an annular groove 172 formed in the exterior surface of the element. The axial width of the groove 172 of each element is less than the axial distance between adjacent edges of passages 160 and counterbore 174, on the one hand and passage 162 and counterbore 176, on the other hand. A passage 178 connects bore 148 with annular channel 70, which is connected to the return port 74. With the valve elements shifted inwardly against the spring 154 so that the edges of the groove of each element lie between the adjacent edges of the passages 160 and 162 and the counterbores 174 and 176 respectively, communication to the reaction chambers 86 and 90 is cut off. Any further shifting inwardly of the valve elements so that the edges of the groove of each element overlaps the edge of its associated counterbore will establish communication between the chambers and the return port 74 via the central portion of the bore 148 and passage 178.

A laterally extending cylindrical member 180, which forms the outer portion of power cylinder 26, is welded to plug 132. Actuation of the control valve 24 will therefore cause the power cylinder and control valve to move as a unit. Within cylindrical member 180 is an inner sleeve 182 which fits onto reduced portion 184 of plug 132. Within inner sleeve 182 is a piston 186 which includes suitable rings to provide a sealed fit between the piston and cylinder. A piston rod 188 is welded to the piston and has its opposite end projecting through a rod guide and closure member 190. The rod is anchored to a fixed part of the vehicle structure 192. Passage 194 formed by outer and inner cylinders 180 and 182 communicates with cylinder passage 66 and with the piston rod side of the piston through passages 196. Cylinder passage 64 communicates directly with the opposite side of the piston. A scissors type anti-rotation device 198 is attached to cylinder member 180 and to a fixed part of the vehicle structure 192 thereby preventing the power unit from rotating about its longitudinal axis but permitting limited movement along its longitudinal axis. Rigid connector elements 200 and 202 connect the valve 24 and power cylinder 26 to tie rods 14 and 16. Spherical ends 204 and 206 of the connector elements are received in socket members located within tie rods 14 and 16, thereby permitting the tie rods to gyrate relative to said connector element.

The advantage of my rack actuated power steering unit lies in the direct transfer of steering wheel rotation into a transverse movement of the valve actuator, thereby improving the steering geometry of the vehicle. Use of the conventional steering gear and pitman arm would create an irregular steering geometry since the pitman arm would move one end of the power steering unit through an arcuate path.

Although my invention has been described in connection with certain specific embodiments, the principles are susceptible of numerous other applications that will readily occur to persons skilled in the art.

Having thus described the various features of the invention, what I claim as new and desire to secure by Letters Patent is:

1. A power steering device for a vehicle comprising steerable wheels, spindle arms and tie rods associated with said wheels, a control valve having a housing member with a bore therein, a valve member movable in opposite directions from a normally neutral position within said bore, an inlet port, a return port, two working ports, pressure reaction means opposing movement of said valve member from a normally neutral position, and pressure regulating means limiting the pressure to the reaction means, a power unit rigidly connected to said control valve, said power unit having an outer casing and an inner casing, a piston within said inner casing, a piston rod connected to said piston and connected to a fixed part of the vehicle structure, passages communicating said power unit with said control valve, one of said passages being formed by the inner and outer casings of said unit, rigid connector elements connecting said power unit and control valve to the ends of said tie rods permitting the tie rods to gyrate relative to said connector elements, means connecting said power unit to a fixed part of the vehicle structure thereby preventing said power unit from rotating about its longitudinal axis but permitting limited movement along its longitudinal axis, a hand operable steering wheel, motion translating means operable by said steering wheel, said motion translating means including a steering shaft, a pinion gear cut on said steering shaft, a rack meshing with said pinion gear, said rack being in coaxial alignment with said power unit and control valve, a ball stud attached to one end of said rack for actuating the valve member lying within said control valve, means surrounding said steering shaft for adjusting the mesh between said pinion and rack, said rack, control valve, and power unit being rigidly connected so as to form an integrated assembly extending laterally of said vehicle their axes being substantially perpendicular to the axis of the steering shaft, said motion translating means thereby providing a direct transfer of steering wheel rotation into a transverse movement of said assembly.

2. A power steering device for a vehicle, comprising steerable wheels, a spindle arm and tie rod associated with each wheel, a power unit having a cylinder and a piston, a piston rod attached to said piston and connected to a fixed part of the vehicle structure, a control valve rigidly connected to and movable with said cylinder, passages communicating said power units with said control valve, rigid connector elements connecting said power unit and control valve to the end of each tie rod, means connecting said cylinder to a fixed part of the vehicle structure thereby preventing said power unit from rotating about its longitudinal axis but permitting movement of said cylinder along its longitudinal axis, a hand operable steering wheel, motion translating means controlled through said steering wheel, said motion translating means including a housing, a steering shaft within said housing, a pinion gear cut on one end of said steering shaft, a rack lying within said housing perpendicular to said steering shaft, said pinion meshing with said rack, said rack being in coaxial alignment with said power unit and control valve, a ball stud attached to one end of said rack for actuating said control valve, means associated with said steering shaft for adjusting the mesh between said pinion and rack, said means including an annular block surrounding said shaft, a needle bearing interposed between said block and said shaft, a spring lying between said block and said housing and an adjusting screw abutting said block diametrically opposite said spring, telescoping boots enclosing both ends of said rack, said motion translating means providing a direct transfer of steering wheel rotation into a transverse movement of said rack, ball stud, control valve and power unit.

3. In a combined power steering unit including a power cylinder and control valve, valve actuating means comprising a hand operable steering wheel, a steering shaft, a pinion gear cut on said steering shaft, a rack meshing with said pinion gear, said rack being perpendicular to said steering shaft and in coaxial alignment with said power cylinder and control valve, a ball stud attached to the end of said rack for actuating said valve, and means associated with said steering shaft for adjusting the mesh between said pinion and rack, said means including an annular block surrounding said shaft, a needle bearing interposed between said block and said shaft, and a spring and adjusting screw on diametrically opposite sides of said annular block.

References Cited in the file of this patent

UNITED STATES PATENTS

| | | |
|---|---|---|
| 2,063,937 | Kundig | Dec. 15, 1936 |
| 2,105,473 | Dean | Jan. 18, 1938 |
| 2,506,093 | MacDuff | May 2, 1950 |
| 2,676,663 | Smith | Apr. 27, 1954 |
| 2,755,876 | Muller | July 24, 1956 |

FOREIGN PATENTS

| | | |
|---|---|---|
| 1,080,086 | France | Dec. 6, 1954 |
| 679,958 | Great Britain | Sept. 24, 1952 |